Jan. 26, 1960   L. R. PHILLIPS ET AL   2,922,580
ELECTRIC CONSTANT VOLUME CONTROL
Filed March 5, 1958   3 Sheets-Sheet 1
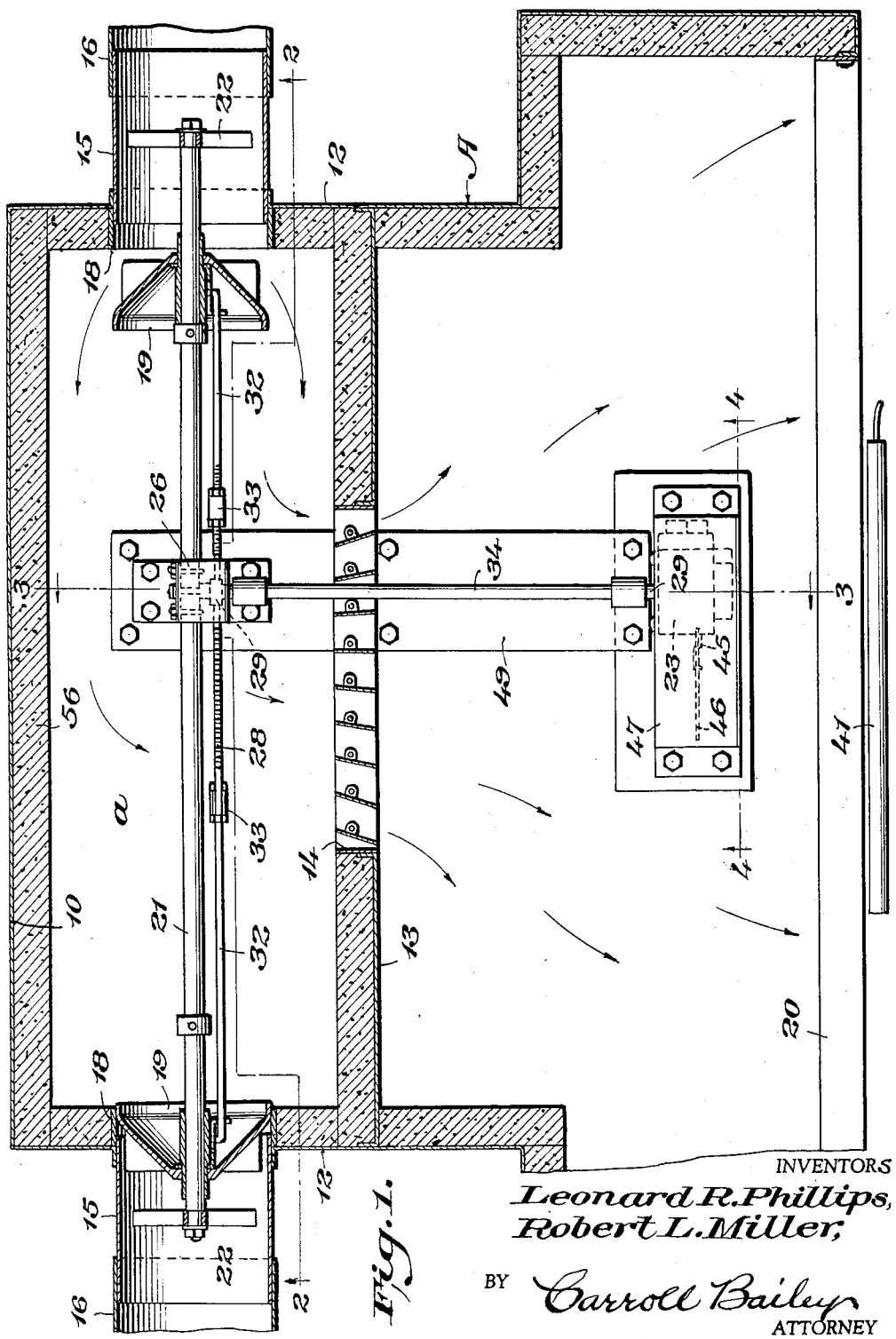
INVENTORS
*Leonard R. Phillips,*
*Robert L. Miller,*
BY *Carroll Bailey*
ATTORNEY

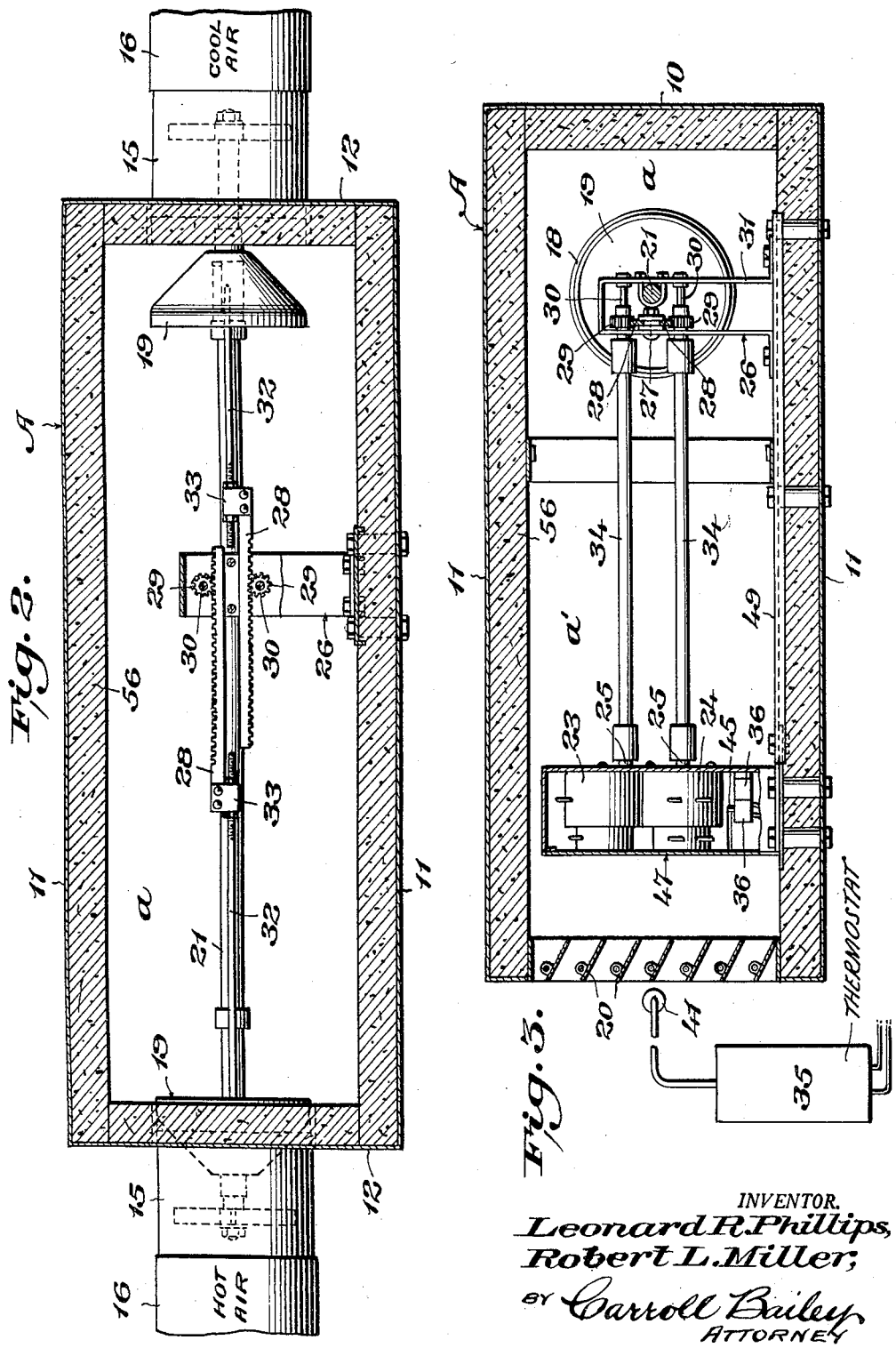

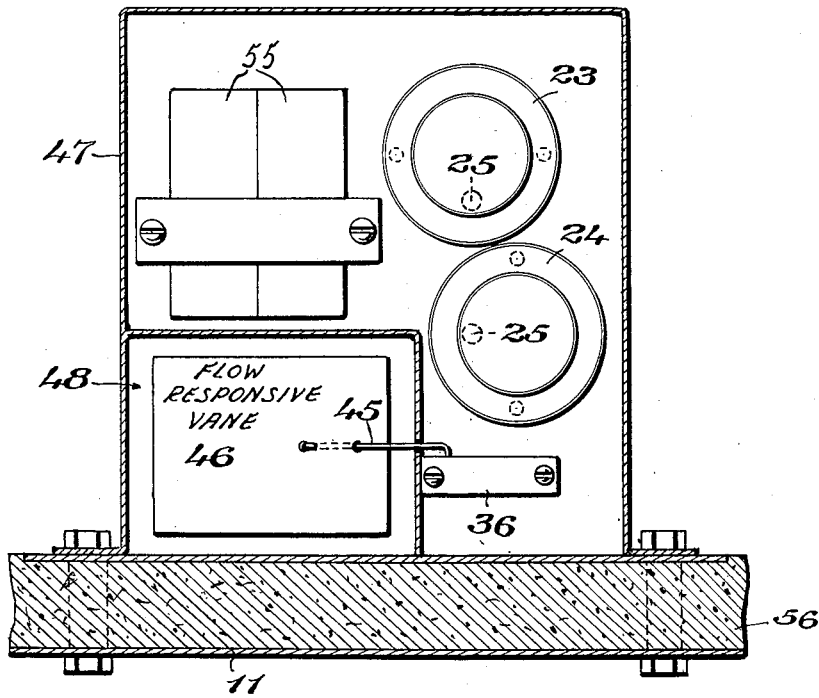
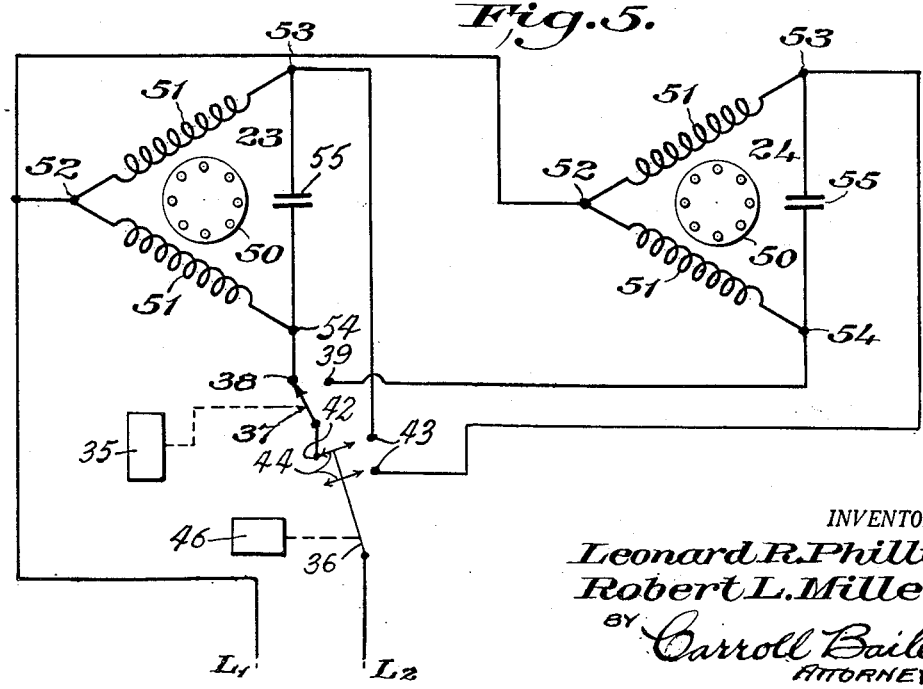

United States Patent Office 2,922,580
Patented Jan. 26, 1960

2,922,580

ELECTRIC CONSTANT VOLUME CONTROL

Leonard R. Phillips, West Hartford, and Robert L. Miller, East Hartford, Conn., assignors to Anemostat Corporation of America, New York, N.Y., a corporation of Delaware Application March 5, 1958, Serial No. 719,391

5 Claims. (Cl. 236—13)

This invention relates to air distribution apparatus of the type wherein two streams of supply air of different temperatures are mixed with each other preparatory to being delivered into an enclosure for heating, cooling, ventilating or other purposes, and has particular reference to improvements in devices for mixing the two streams, for regulating the proportional amounts of the two streams to maintain the enclosure temperature substantially constant, and for reducing the total volume of the two streams whenever it exceeds the established volume requirements of the enclosure to maintain the volume of air supplied to the enclosure substantially constant.

Generally speaking, the object of the invention is to provide a device of the character mentioned which is fully automatic in response to variations in the temperature of the air in the enclosure to regulate the proportional amounts of the two streams of supply air to maintain the temperature of the air in the enclosure substantially constant, and which is equally fully automatic in response to increase above normal in the rate of flow of supply air into the enclosure to restore such flow to a normal rate.

According to the invention, the device includes a pair of valves, one to regulate flow of warm or hot air into an enclosure for heating purposes and the other to regulate flow of cool or cold air into the enclosure for cooling purposes, and a pair of reversible electric motors connected to said valves, respectively, for opening and closing the same. In this connection and as contributing importantly to the low production cost of the device, a more particular object of the invention is to provide a control system for said motors which embodies a simple, well-known, inexpensive, commercially available "on"-"off" type switch and simple means whereby such switch is operable in response to increase above normal in the rate of flow of supply air into the enclosure to cause both motors to operate to close the valves to restore such flow to normal. Further in this connection and as contributing importantly to the low production cost of the device, another more particular object of the invention is to provide a control system for the said motors which additionally embodies a simple, well-known, inexpensive, commercially available thermostat of the "on"-"off" switch type which is effective to control operation of said motors selectively to open said valves selectively to supply more hot or more cold air to the enclosure whenever necessary to maintain the temperature of the air in the enclosure substantially constant.

With the foregoing and other objects in view, as will become more fully apparent as the nature of the invention is better understood, the same resides in a device embodying the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Fig. 1 is a longitudinal section through an air flow control device constructed in accordance with the invention.

Fig. 2 is a longitudinal section taken approximately on the line 2—2 of Fig. 1.

Fig. 3 is a transverse section taken approximately on the line 3—3 of Fig. 1.

Fig. 4 is an enlarged detail section taken approximately on the line 4—4 of Fig. 1; and Fig. 5 is a wiring diagram of the electrical components of the device.

Referring to the drawings in detail, it will be observed that the present device comprises a suitable housing or casing, designated generally as A, which appropriately may be of generally rectangular shape and which is composed of a rear wall 10, side walls 11, 11 and end walls 12, 12. Preferably a partition 13 extends from side to side and from end to end of said casing and divides the same into a plenum chamber $a$ and an attenuation chamber $a'$. In said partition is an opening 14 through which the chamber $a$ communicates with the chamber $a'$.

Connected to the portions of the end walls 12, 12 which form the ends of the plenum chamber $a$ are tubes 15, 15, respectively, which define air supply ports opening into said chamber, while connected to said tubes are ducts 16, 16 respectively, for the delivery of air of different temperatures from any sources of supply to said chamber, one of said ducts 16 being, for example, a hot air supply duct and the other being, for example, a cool air supply duct.

The tubes 15, 15 are axially alined with each other and at their inner ends are provided with suitable valve seats 18, 18, respectively, with which cooperate suitable valves 19, 19, respectively, for regulating flow of air from the ducts 16, 16 into the plenum chamber $a$.

The attenuation chamber $a'$ may be provided at any suitable point with any suitable form of outlet for delivery of air from said chamber into a room or other enclosure. In this connection and as illustrated by way of example in the drawings, the front of the casing A is open for flow of air from the attenuation chamber $a'$ and is provided with vanes 20 for directing and diffusing the air issuing from said chamber. Alternatively, any other suitable means for directing and diffusing the air issuing from said chamber may be provided if desired.

The valves 19, 19 are axially alined with the tubes 15, 15 and with each other and are suitable mounted in the plenum chamber $a$ for axial or reciprocal movements toward and away from their seats 18, 18 to control flow of supply air through the tubes 15, 15 into said plenum chamber $a$. For example, said valves may be slidably mounted on a guide rod 21 which is supported at its ends in spiders 22 mounted in the tubes 15, 15.

Suitably mounted at any suitable locations in the casing A are two electric motors 23 and 24 which are suitably connected to the valves 19, 19 respectively, for opening and closing the same.

The motors 23, 24 are of any suitable reversible, very low speed type and appropriately may be mounted in the attenuation chamber $a'$ with the axes of their power shafts 25, 25 disposed at right angles to the axes of the valves 19, 19 as shown.

Appropriately, too, the motors 23, 24 may have rack and pinion connections with the valves 19, 19. In this connection and as illustrated by way of example in the drawings, a bracket 26 of inverted U-shape is fixed in the plenum chamber $a$ and carries guide means 27 wherein are mounted for longitudinal sliding movement a pair of rack bars 28, 28 which extend longitudinally of said plenum chamber and are engaged by pinions 29, 29 respectively, which are fixed on shafts 30, 30 journaled in the side walls 31 of the bracket 26.

The rack bars 28, 28 are connected to the valves 19, 19 by actuating rods 32, 32 respectively, and adjustable connections 33, 33 are provided between said rack bars and said rods for the purpose of initially adjusting the valves 19, 19 relative to their seats 18, 18 when said rack bars are in any given positions.

The power shafts of the motors 23, 24 are connected to the pinion shafts 30, 30 by drive shafts 34, 34, respectively. Hence, rotation of either motor in one direction is effective to open its related valve, while rotation of either motor in the opposite direction is effective to close its related valve. In this connection it will be noted that the pinions 29, 29 engage teeth at opposite side edges, respectively, of the rack bars 28, 28. Therefore, closing of the valves is effected by rotation of the motors in the same direction, while opening of the valves is effected by rotation of the motors in the opposite direction.

Operation of the motors 23, 24 is controlled, on the one hand, by a thermostat 35 which may be operable in response to changes in temperature of either the air being supplied to an enclosure by the device or by the air in the enclosure, and, on the other hand, by a double-pole, double-throw switch 36 which is operable in response to changes in the rate of flow of air through the device into the enclosure.

The thermostat 35 may be of any suitable known type and therefore is not illustrated in detail. Suffice it to say that the same is settable for any desired temperature to be maintained in an enclosure supplied with air by the device and that it includes a double throw, single pole, "on"-"off" type switch element 37 which closes in one direction against a contact 38 when the enclosure temperature drops slightly below the temperature at which the thermostat is set and which closes in the opposite direction against a contact 39 when the enclosure temperature rises slightly above the temperature at which the thermostat is set.

While the degree of sensitivity of the thermostat 35 is arbitrary, its sensitivity preferably is such that about a one degree rise or fall of the enclosure temperature above or below any given temperature setting of the thermostat will result in the switch element 37 engaging either the contact 38 or the contact 39, as the case may be.

The thermostat 35 may, of course, be located at any suitable point so as quickly to be affected by a slight drop below or a slight rise above the aforesaid predetermined temperature of the air in the enclosure or of the air being supplied to the enclosure, and it may include, if desired, a temperature sensing tube 41 or equivalent element which may be strategically located to enhance the sensitivity of the instrument.

The switch 36 may be of any suitable known type and therefore is not illustrated in detail. Suffice it to say that the same includes a back contact 42, a pair of front contacts 43, 43 and a pair of movable elements 44, 44, one of which normally engages the back contact 42 and both of which are shiftable into engagement with the front contacts 43, 43 by only slight force exerted upon a lever arm 45 which is connected to said movable elements.

In accordance with the invention the lever arm 45 has fixed thereto a vane 46 and the switch 36 is located in the attenuation chamber $a'$ preferably at a point such that said vane is exposed to the maximum velocity of the air flowing through said chamber. The vane 46 is disposed, of course, perpendicularly with reference to the direction of flow of air through the chamber $a'$ so that the air impinges against said vane. When the air flow exceeds a predetermined velocity it acts against said vane with a force sufficient to swing the lever arm 45 to cause the movable switch elements 44, 44 to engage the front contacts 43, 43. When, on the other hand, the velocity of the air flow drops below said predetermined velocity, with consequent reduction in the force exerted against the vane 46, both switch elements 44 return to their normal positions in which one of said switch elements engages the back contact 42.

The switch 36 is highly sensitive so that its movable elements 44, 44 are engageable with the front contacts 43, 43 or one of them is engageable with the back contact 42 by only a slight increase or decrease in the velocity of the air flowing through the attenuation chamber $a'$ above or below a selected predetermined velocity.

The velocity or rate of flow of air passing through the attenuation chamber $a'$ is, of course, a measure of the volume of air supplied through the device to an enclosure during any given period of time. For any given enclosure the amount of air to be supplied thereto during a given period of time to maintain the enclosure air fresh or for any other purpose may readily be determined. In this connection, when the air volume requirements for an enclosure supplied with air by the device have been determined, a vane 46 of proper area in relation to the velocity or the rate of flow of the air through the device corresponding to the air volume requirements of the enclosure is mounted on the lever arm 45 so that if such velocity or rate of flow is only slightly exceeded, the force exerted by the air against said vane 46 will be sufficient to swing the lever arm 45 to cause the movable switch elements 44, 44 to engage the front contacts 43, 43, respectively. When the velocity or rate of flow of the air passing through the device is restored to normal or, in other words, to the determined volume requirements of the enclosure, the movable switch elements 44, 44 will, of course, return to positions in which one of them will engage the back contact 42.

Appropriately the switch 36 may be mounted in a box 47 in which the motors 23, 24 may also be mounted, the said box having an air passageway 48 wherein the vane 46 is disposed. Appropriately, too, the box 47 and the bracket 26 may be mounted upon a common base 47 so that the actuating means for the valves 19, 19 constitute an unitary assembly. The base 47 may, of course, be bolted or otherwise suitably mounted in the casing A.

The motors 23, 24 preferably are duplicates of each other and, as diagrammatically illustrated in Fig. 5 of the drawings, may be of the alternating current, synchronous type. Each motor comprises a rotor 50 and two field windings 51, 51 which, as usual, are angularly spaced to produce a rotary field when the currents flowing therethrough are suitably phased-displaced. A common terminal 52 of the field windings of each motor is connected to one side $L_1$ of a current supply line. Across the other terminals 53, 54 of each motor is connected a phase-displacing capacitor 55. Like terminals 53, 53 of the motor windings are connected to the front contacts 43, 43, respectively, of the switch 36. The other like terminals 54, 54 of the motor windings are connected to the contacts 38, 39, respectively, of the thermostat 35. The other side $L_2$ of the current supply line is connected to the movable elements 44, 44 of the switch 36, while the back contact 42 of said switch 36 is connected to the switch element 37 of the thermostat 35.

From the foregoing it will be apparent that when the movable elements 44, 44 of the switch 36 are engaged with the front contacts 43, 43 of said switch, both motor circuits will be closed and the motors will operate simultaneously in the same direction. This, according to the invention, will result in the valves 19, 19 being simultaneously moved toward closed positions. When, on the other hand, one of the movable elements 44, 44 of the switch 36 is engaged with the back contact 42 of said switch, as illustrated in Fig. 5, one or the other of the motors 23, 24 may operate in the reverse direction to open it related valve 19 individually, depending upon whether the movable switch element 37 of the thermostat 35 is engaged with its related contact 38 or 39. In this connection, since the switch element 37 can engage only one of the contacts 38 or 39 at any given time, only one of the motors 23 or 24 may operate at any given time to open its related valve 19. The motors 23, 24 are of such low speed that several minutes, from six to eight minutes, for example, are required for either motor to shift its related valve 19 through its full range of opening or closing movement.

Assuming that the total amount of hot and cold air flowing through the device is sufficient to satisfy and does not exceed the supply air requirements of the enclosure being supplied with air by the device, the switch 36 will assume its normal position as shown in Fig. 5 with one of the movable elements 44, 44 engaged with the back contact 42. In that case only rise or fall in the temperature of the air in or being supplied to the enclosure above or below the predetermined temperature to be maintained substantially constant in the enclosure will result in operation of one or the other of the motors 23, 24 to open its related valve to supply more cold or hot air to the enclosure to compensate for rise or fall of the enclosure temperature above or below the predetermined temperature to be maintained substantially constant in the enclosure. If, for example, the temperature of the air in the enclosure should rise above the substantially constant temperature to be maintained in the enclosure, the movable switch element 37 of the thermostat will engage the contact 39 and thereby the motor 24 will be caused to operate in a direction to open the cold air valve 19 to increase the cold air flow to reduce the enclosure temperature. Conversely, should the temperature of the air in the enclosure fall below the substantially constant temperature to be maintained in the enclosure, the switch element 37 will engage the contact 38 and thereby the motor 23 will be caused to operate to open the hot air valve 19 to increase the hot air supply to raise the enclosure temperature. In short, as long as the switch 36 is in its normal position with one of its switch elements engaged with the contact 42, the thermostat 35 will cause operation of one or the other of the motors 23 or 24 in a direction to open one or the other of the valves 19, 19 to admit more hot or cold air to the enclosure as may be required to maintain the temperature of the air in enclosure substantially constant.

In either of the recited cases, opening of the cold or the hot air valve may result in the velocity of the air flowing through the device exceeding the predetermined air volume requirements of the enclosure by an amount such that the force exerted by the supply air against the vane 46 will cause engagement of the movable switch elements 44, 44 of the switch 36 with the front contacts 43, 43 of said switch. Thereupon, both motors 23, 24 will be caused to operate in the same direction to close both valves until the total volume of the air being supplied to the enclosure is reduced to the point where it does not exceed the air volume requirements of the enclosure. The switch elements 44, 44 then will return to their normal positions with one of them in engagement with the back contact 42, whereupon selective operation of the motors 23, 24 under control of the thermostat 35 will occur as previously described to selectively open the valves 19, 19 to maintain the temperature of the air in the enclosure substantially constant.

Of course, there may be other reasons why the velocity of the air flowing through the device rises to the point where the force exerted by the air against the vane 46 will cause engagement of the switch elements 44, 44 with the contacts 43, 43. The result, however, will be the same as just recounted. First, both of the motors 23, 24 will be caused to operate in the same direction to close the valves 19, 19 until the total volume of air supplied to the enclosure is reduced to normal. The swtich 36 then will return to its normal position in which one of its movable elements 44 is engaged with the back contact 42. Selective opening of the valves 19, 19 under control of the thermostat switch 35 then will occur to compensate for rise or fall above or below normal of the enclosure temperature.

Summarizing, the present device is effective to reduce the air supply to an enclosure whenever the supply exceeds the predetermined air supply requirements of the enclosure, and additionally is effective to increase the hot or the cold air supply to the enclosure to raise or lower the enclosure temperature whenever the enclosure temperature falls only slightly below or rises only slightly above a predetermined settable degree.

For sound deadening purposes the casing A preferably is lined with glass wool or other suitable material 56.

Obviously, the opposed relationship of the hot and the cold air inlets will result in the streams of the hot and the cold supply air meeting head-on in the plenum chamber $a$ and thereby becoming effectively intermixed. Additional mixing of said streams obviously will occur in the attenuation chamber $a'$.

From the foregoing description considered in connection with the accompanying drawings, it is believed that the construction and mode of operation of the present device will be clearly understood and that its advantages will be appreciated. It is desired to point out, however, that while only a single, specific structural embodiment of the device has been illustrated and described, the same is readily capable of various other specifically different structural embodiments within the spirit and scope of the invention as defined in the appended claims.

We claim:

1. An air flow control device comprising a housing having, plenum and attenuation chambers, a partition separating said chambers and an outlet for flow of the mixed air into an enclosure, inlets for hot and cold air disposed in opposite walls of said plenum chamber, rigid valves cooperating with each of said inlets, a guide rod mounted longitudinally within said plenum chamber and extending within said opposed inlets, means at the ends of said guide rod for axially supporting the rod within said inlets, said valves axially and slidably mounted upon said guide rod for reciprocable movement to and from closed position within said inlets, an actuating rod carried by each valve extending parallel to said guide rod and provided with a gear rack at one end, a bracket disposed intermediate of said valves and having separate gear means for engaging each of said gear racks, separate drive means connected to each of said gear means and including a pair of reversible electric motors for opening and closing said valves, switch means operable in response to the rate of flow of air through said housing exceeding a predetermined normal rate to direct current through both of said motors to cause them to operate simultaneously in directions to effect closing movements of both of said valves to restore the rate of flow of the air to normal and operable in response to restoration of the predetermined normal rate of flow of the air to direct current to said motors for their reverse direction valve opening operation, and other switch means between said motors and said first mentioned switch means operable in response to a drop in the enclosure temperature below a predetermined degree to close the reverse direction circuit through the motor that is connected to the hot air control valve to effect opening of the latter valve, and operable in response to a rise in the enclosure temperature above said predetermined degree to close the reverse direction circuit of the motor that is connected to the cold air control valve to effect opening of the latter valve, thereby to maintain the enclosure temperature substantially constant.

2. An air flow control device comprising a housing having two inlets for air of different temperatures respec- enclosure, a pair of rigid valves mounted for reciprocable enclosure, a pair of rigid valves mounted for reciprocal movement controlling said inlets, respectively, a pair of reversible electric motors connected to said valves, respectively, both of said motors operable in one direction to close their related valves and each of said motors operable one at a time to move in the reverse direction to open its related valve, switch means operable in response to the rate of flow of air through the device exceeding a predetermined normal rate to direct current through said motors to cause them to operate in directions to effect closing movements of both of said valves to restore the rate of flow of the air to normal and operable in response to restoration of the predetermined normal rate of flow of the air through the device to direct current to said motors for their reverse direction operation to effect opening of said valves, and other switch means between said motors and said first mentioned switch means operable in response to variations in the temperature of the enclosure air to control reverse direction operation of said motors selectively and individually for selective individual opening of said valves to maintain the enclosure temperature substantially constant.

3. An air flow control device comprising a housing having two inlets for hot and cold air, respectively, and an outlet for flow of air therefrom into an enclosure, a pair of rigid valves mounted for reciprocable movement controlling said inlets, respectively, a pair of reversible electric motors connected to said valves, respectively, and both operable in one direction at the same time to close their related valves and each of said motors operable one at a time to move in the reverse direction to open its related valve, motor reversing switch means having a normal position, assumed when the flow of air through the device is at a predetermined normal rate, in which current is directed to said motors for their operation in directions to open said valves, means operable in response to the flow of air through the device exceeding said predetermined normal rate to actuate said switch means to a position to direct current through said motors for their operation in directions to effect closing of said valves and restoration of the flow of air through the device to the predetermined normal rate, and other switch means between said motors and said first mentioned switch means operable in response to rise in the enclosure temperature above a predetermined degree when said first mentioned switch means is in its normal position to close the circuit of the motor for operating the cold air valve to cause opening of the cold air valve and restoration of the enclosure temperature to said predetermined degree and operable in response to drop in the enclosure temperature below said predetermined degree when said first mentioned switch means is in the normal position to close the circuit of the motor for operating the hot air valve to cause opening of the hot air valve and restoration of the enclosure temperature to said predetermined degree.

4. An air flow control device comprising a housing having an inlet for hot air, an inlet for cold air, a chamber in which the hot air and the cold air are received and mixed, and an outlet for flow of the mixed air into an enclosure, a pair of valves mounted for reciprocable movement controlling said inlets, respectively, a pair of reversible electric motors connected to said valves, means responsive to the flow of air through said mixing chamber, a two-position switch operable by said flow responsive means to assume a second position to actuate both drive motors to close both valves when the air flow exceeds a predetermined normal rate, said switch returned to its normal position by said flow responsive means when the air flow is reduced to its predetermined normal rate, a two-position thermostatic switch between said first mentioned switch and said electric motors operable when said first mentioned switch is in its normal position to actuate one of said motors to open the cold valve in response to an air temperature exceeding a predetermined degree to restore the temperature to its normal degree and to actuate the other of said motors to open the hot valve in response to an air temperature falling below a predetermined degree to restore the temperature to its normal degree.

5. An air flow control device comprising a housing having plenum and attenuation chambers, a partition separating said chambers and an outlet for flow of the mixed air into an enclosure, inlets for hot and cold air disposed in opposite walls of said plenum chamber, rigid valves cooperating with each of said inlets, a guide rod mounted longitudinally within said plenum chamber and extending within said opposed inlets, means at the ends of said guide rod for axially supporting the rod within said inlets, said valves axially and slidably mounted upon said guide rod for reciprocable movement to and from closed position within said inlets, an actuating rod carried by each valve extending parallel to said guide rod and provided with a gear rack at one end, a bracket disposed intermediate of said valves and having separate gear means for engaging each of said gear racks, separate drive means connected to each of said gear means and including low-speed reversible electric motors, means responsive to the flow of air through said attenuation chamber, a two-position switch operable by said flow responsive means to assume a second position to actuate both drive motors to close both valves when the air flow exceeds a predetermined normal rate, said switch returned to its normal position by said flow responsive means when the air flow is reduced to its predetermined normal rate, a two-position thermostatic switch between said first mentioned switch and said electric motors operable when said first mentioned switch is in its normal position to actuate one of said motors to open the cold valve in response to an air temperature exceeding a predetermined degree to restore the temperature to its normal degree and to actuate the other of said motors to open the hot valve in response to an air temperature falling below a predetermined degree to restore the temperature to its normal degree.

References Cited in the file of this patent

UNITED STATES PATENTS

| | | |
|---|---|---|
| 2,609,183 | Fitzgerald | Sept. 2, 1952 |
| 2,813,474 | Kurth et al. | Nov. 19, 1957 |
| 2,822,132 | McDonald et al. | Feb. 4, 1958 |
| 2,835,449 | Joesting | May 20, 1958 |